April 11, 1961   H. A. GOSS   2,978,767
CHAIN HOOK
Filed March 10, 1959
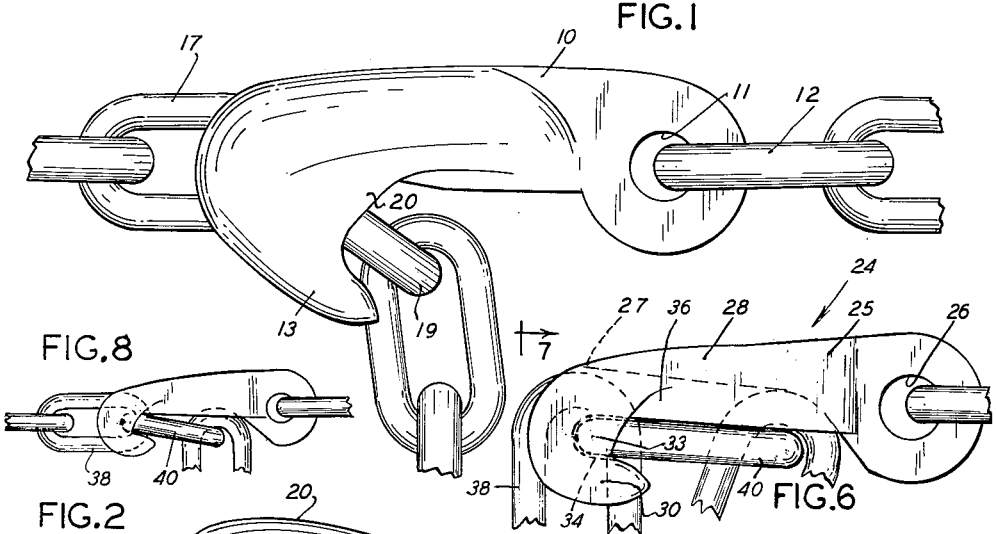
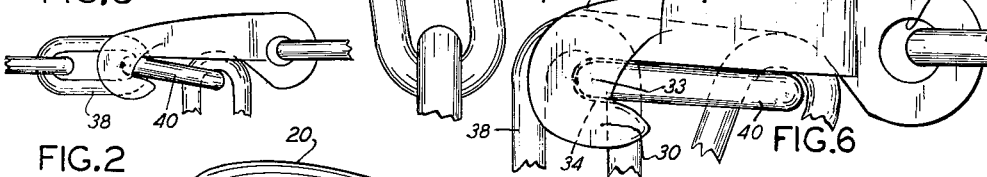
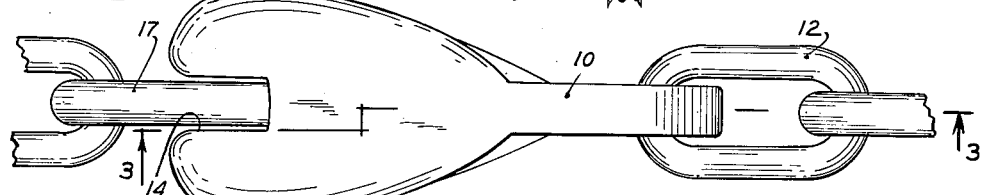
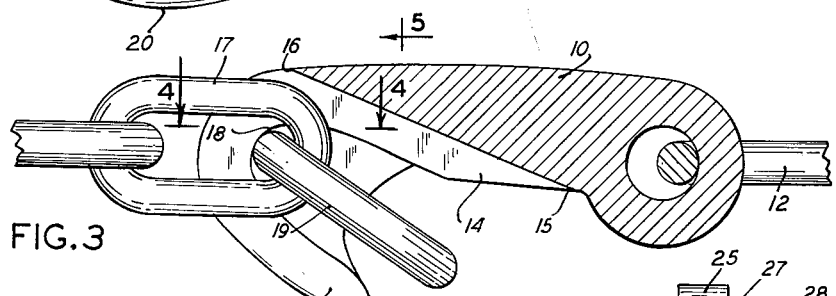
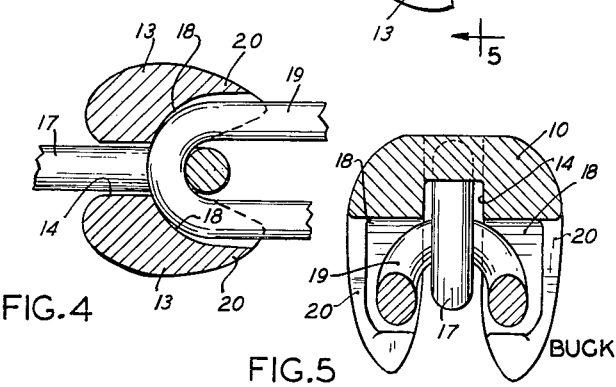
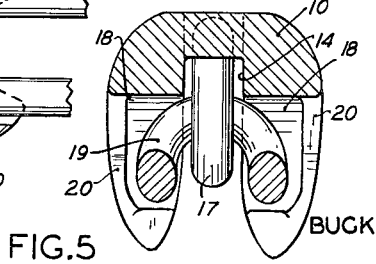
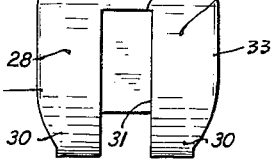
INVENTOR.
HERBERT A. GOSS
BY
BUCKHORN, CHEATHAM & BLORE
ATTORNEYS

United States Patent Office 2,978,767
Patented Apr. 11, 1961

2,978,767
CHAIN HOOK

Herbert A. Goss, 1375 Madras Highway, Prineville, Oreg.

Filed Mar. 10, 1959, Ser. No. 798,542

3 Claims. (Cl. 24—116)

My present invention comprises an improvement in hooks for engaging an end or intermediate link of a chain consisting of oval links with alternate links lying in planes at right angles to each other. Chain hooks of this nature are commonly used in binding heavy objects together or to the carrier, such as in the binding of a load of logs onto a trailer. In the usual application the chain hook is attached to a log binder device consisting of a toggle linkage whereby the chain may be drawn taut. The force exerted by such a device, or other equivalent devices, is sometimes great enough to cause the chain to gouge into the logs or other material. Under the terrific strains thus imposed the usual chain hook tends to rupture or sever a link, with resulting extreme danger to the person manipulating the binder. Or, as the load is in transit, the chafing and twisting which naturally occurs may result in delayed failure of the chains or of the hook itself, thus causing sometimes fatal accidents due to the load falling onto the road into the path of or onto other vehicles.

The principal object of the present invention is to provide a chain hook which will not fail in use, will not spread, rupture or chafe the chain links to which it is applied, and which is as strong as the chain itself. The object of the present invention is achieved by use of a special configuration in the body of the chain hook, as will presently appear.

In the drawings,

Fig. 1 is a side elevation of one form of the present invention applied to an intermediate link of a chain;

Fig. 2 is a plan view of Fig. 1;

Fig. 3 is a view showing the chain hook applied to the end link of a chain with the hook being broken away substantially along line 3—3 of Fig. 2;

Fig. 4 is a partial, horizontal section taken substantially along line 4—4 of Fig. 3;

Fig. 5 is a vertical section taken substantially along line 5—5 of Fig. 3;

Fig. 6 is a side elevation of a modified form of chain hook; and

Fig. 7 is an end elevation of Fig. 6 taken from the plane of 7—7 of Fig. 6.

Fig. 8 is a view, on a reduced scale, illustrating the chain of Fig. 6 in operative position.

Referring to Figs. 1 to 5, inclusive, the hook of the present invention comprises a central portion 10 of substantial depth and having an eye 11 at one end through which is permanently attached the end link 12 of a section of chain. The opposite end of the body is reversely directed and longitudinally, centrally slotted to provide a pair of reversely directed claws 13, the slot 14 between the claws commencing at one side of the body near the eye 11, at the point indicated at 15, and extending diagonally through the body away therefrom to a point adjacent and behind the bight of the claws, indicated at 16. The central portion of the hook is thereby tapered to a narrow extremity. The slot 14 is only slightly wider than a link so that one end of an intermediate link 17 of the chain to which the hook is to be applied is maintained in alignment with the body 10 of the hook. The inner surfaces of the bights of the claws are rounded and concave, as indicated at 18, so as to engage the succeeding link 19 over a relatively broad surface, thus spreading the strain. Web portions 20 on each side of the hook brace the bight portions of the claws and extend around the succeeding link to quite an extent so as to maintain the link 19 in proper position. The inner surfaces of the webs 20 are curved in two directions so as to correspond to the general toroidal curvature of the received link 19, as is shown in Figs. 3 and 4, thereby assuring engagement of the link 19 over a broad area. It will be seen in Fig. 3 that the link 17 extends into the groove 14 for a considerable distance, thus maintaining the links in right angle relation to each other.

In the modification disclosed in Figs. 6 and 7 the hook comprises a central portion 25 which is in the form of a bar having an eye 26 at one end for attachment of a chain link and which extends to a tapered end 27. A pair of formed bars 28 are provided on opposite sides of the bar 25, the ends of the bars 28 being reversely directed to provide a pair of spaced claws 30 with a slot 31 therebetween. The slot 31 extends diagonally through the body of the hook from a point 32 close to the eye to the end 27, thus extending into the portion which embraces a chain link to maintain it in right angle relation to the link which is engaged by the claws 30. A web 33 (similar to the web 20) is provided on each of the claws 30 to strengthen the claws.

As shown in Fig. 6, the portions 34 of the claws 30 adjacent the bight are spaced from the shank portion 36 of the claws by a distance just slightly greater than the diameter of the chain links, and are substantially parallel to the shank portions. This construction requires that adjacent chain links be positioned at right angles to one another as shown by chain links 38, 40 in Fig. 6 to mount or remove the hooks from a chain. Thus the chain hook 24 is not apt to be accidentally dislodged from a chain during use.

Having illustrated and described a preferred embodiment of the present invention, it should be apparent to those skilled in the art that the same permits of modification in detail and arangement. I claim as my invention all such modifications as come within the true spirit and scope of the appended claims.

I claim:

1. Chain hook for engaging a chain having oval links interengaged with each other and with alternate links lying in planes at right angles to each other, comprising an elongated central portion having means at one end to attach a chain thereto, a pair of claws at the other end of said central portion, said claws being positioned on opposite sides of said central portion and having bight portions extending in a direction longitudinally of said central portion beyond said other end of said central portion, said bight portions having curved, concave, inner surfaces rounded in two directions so as to correspond to the general toroidal curvature of a received link so as to engage said received link over a broad area, said claws being laterally spaced a distance slightly wider than the thickness of a first chain link positioned between said claws so that said first chain link rests in a slot closely confining the link, and said hook having web portions extending between said central portion and said bight portions to brace said claws, said web portions being laterally spaced adjacent said bight portions a distance greater than the width of a succeeding chain link so as to receive said succeeding link between said webs when said succeeding link is at right angles to said first chain link and has an end engaging said bight portions.

2. A chain hook for engaging a chain having oval links interengaged with each other and with alternate links lying in planes at right angles to each other, comprising an elongated central portion having means at one end to attach a chain thereto, said portion being of substantial depth adjacent said means at said one end and tapering to a narrow extremity at its other end, a pair of claws at said other end, said claws being positioned on opposite sides of said central portion and providing bight portions extending in a direction longitudinally of said central portion beyond said other end of said central portion, said bight portions having curved, concave, inner surfaces rounded in two directions so as to correspond to the general toroidal curvature of a received link so as to engage said received link over a broad area, said claws being laterally spaced a distance slightly wider than the thickness of a first chain positioned between said claws so that said first chain link rests in a slot closely confining the link, said hook having web portions extending between said central portion and said bight portions to brace said claws, said web portions being laterally spaced adjacent said bight portions a distance greater than the width of a succeeding chain link so as to receive said succeeding link between said webs when said succeeding link is at right angles to said first chain link and has an end engaging said bight portions.

3. A chain hook for engaging a chain having oval links interengaged with each other and with alternate links lying in planes at right angles to each other, comprising an elongated central portion having means at one end to attach a chain thereto, said portion being of substantial depth adjacent said means at said one end and tapering to a narrow extremity at its other end, a pair of claws at said other end, said claws being positioned on opposite sides of said central portion and providing bight portions extending in a direction longitudinally of said central portion beyond said other end of said central portion, said bight portions having curved, concave, inner surfaces rounded in two directions so as to correspond to the general toroidal curvature of a received link so as to engage said received link over a broad area, said claws being laterally spaced a distance slightly wider than the thickness of a first chain link positioned between said claws so that said first chain link rests in a slot closely confining the link, said hook having web portions extending between said central portion and said bight portions to brace said claws, said web portions being laterally spaced adjacent said bight portions a distance greater than the width of a succeeding chain link so as to receive said succeeding link between said webs when said succeeding link is at right angles to said first chain link and has an end engaging said bight portions, said webs merging into said bight portions to provide rounded concave surfaces receiving said end of said succeeding link.

References Cited in the file of this patent

UNITED STATES PATENTS

| 1,470,481 | Popps | Oct. 9, 1923 |
| 2,448,482 | Woolslayer et al. | Aug. 31, 1948 |